United States Patent
Fuertsch et al.

(10) Patent No.: US 7,060,197 B2
(45) Date of Patent: Jun. 13, 2006

(54) MICROMECHANICAL MASS FLOW SENSOR AND METHOD FOR THE PRODUCTION THEREOF

(75) Inventors: Matthias Fuertsch, Gomaringen (DE); Frank Fischer, Gomaringen (DE); Lars Metzger, Albstadt (DE); Frieder Sundermeier, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 166 days.

(21) Appl. No.: 10/362,654

(22) PCT Filed: Jun. 8, 2002

(86) PCT No.: PCT/DE02/02096

§ 371 (c)(1),
(2), (4) Date: Aug. 7, 2003

(87) PCT Pub. No.: WO03/001158

PCT Pub. Date: Jan. 3, 2003

(65) Prior Publication Data

US 2004/0026365 A1    Feb. 12, 2004

(30) Foreign Application Priority Data

Jun. 23, 2001    (DE) ................. 101 30 379

(51) Int. Cl.
*C23F 1/00*    (2006.01)

(52) U.S. Cl. .................. 216/79; 216/2; 216/51; 216/52; 216/89; 438/692; 438/719; 438/723; 438/735; 438/760; 438/770

(58) Field of Classification Search .................... 216/2, 216/41, 51, 52, 79, 88–91; 438/706, 710, 438/719, 723, 735, 747, 690–692, 760, 770
See application file for complete search history.

(56) References Cited

U.S. PATENT DOCUMENTS 5,237,867 A    8/1993    Cook (Continued)

FOREIGN PATENT DOCUMENTS

DE    195 27 861    1/1997
EP    1 008 837    6/2000

OTHER PUBLICATIONS

Wolf et al., Silicon Processing for the VLSI Era, 1986, Lattice Press, vol. 1, pp. 198, 200-201.*
Wolf, Silicon Processing for the VLSI Era, 1992, Lattice Press, vol. 2, pp. 66-69.*
Wilson et al., Handbook of Multilevel Metallization for Integrated Circuits, 1993, Noyes Publications, pp. 382-383, 426-427.*

*Primary Examiner*—Nadine G. Norton
*Assistant Examiner*—Eric B. Chen
(74) *Attorney, Agent, or Firm*—Kenyon & Kenyon

(57) ABSTRACT

In a mass flow sensor having a layered structure on the upper side of a silicon substrate (1), and having at least one heating element (8) patterned out of a conductive layer in the layered structure, thermal insulation between the heating element (8) and the silicon substrate (1) is achieved by way of a silicon dioxide block (5) which is produced beneath the heating element (8) either in the layered structure on the silicon substrate (1) or in the upper side of the silicon substrate (1). As a result, the sensor can be manufactured by surface micromechanics, i.e. without wafer back-side processes.

7 Claims, 7 Drawing Sheets

U.S. PATENT DOCUMENTS 5,426,070 A * 6/1995 Shaw et al. .................... 216/2
5,610,335 A * 3/1997 Shaw et al. .............. 73/514.36
5,719,073 A * 2/1998 Shaw et al. ................... 438/53
5,847,454 A * 12/1998 Shaw et al. ................. 257/734
6,051,866 A * 4/2000 Shaw et al. ................. 257/417
6,199,874 B1 * 3/2001 Galvin et al. ............ 280/5.514
6,461,888 B1 * 10/2002 Sridhar et al. ................ 438/52
2002/0127760 A1 * 9/2002 Yeh et al. ..................... 438/50

* cited by examiner

MICROMECHANICAL MASS FLOW SENSOR AND METHOD FOR THE PRODUCTION THEREOF

FIELD OF THE INVENTION

The invention relates to a micromechanical mass flow sensor using silicon technology. The present invention furthermore relates to a method for manufacturing such a sensor.

BACKGROUND OF THE INVENTION

Silicon micromechanics may allow economical mass production of small sensor chips using semiconductor technology methods. Mass flow sensors having dimensions on the order of a few hundred micrometers are used, for example, in the automotive sector to control air delivery.

Mass flow sensors using silicon micromechanics from other systems, for example as discussed in German Published Patent Application No. 195 27 861, encompass a heating element and typically several temperature measurement elements, all of which are patterned out of a metal resistor layer and are positioned on a thin membrane made of dielectric material. The membrane spans a recess in a silicon substrate.

When a flow of medium, in particular an air flow, flows along the upper side of the membrane, that flow of medium causes cooling of the membrane. That cooling can be evaluated, in particular, using one temperature measurement element placed upstream (relative to the heating element) and a further temperature measurement element placed downstream, the measurement element placed upstream being more greatly cooled than the one placed downstream. Alternatively, the cooling of the membrane may be determined by measuring the resistance of the heating element. The temperature measurement elements are also resistors, which are made of a material whose resistance is temperature-dependent. One material that is suitable for the heaters and the temperature measurement elements is platinum.

German Published Patent Application No. 195 27 861 discusses the manufacture of a membrane sensor of this kind, to begin with a silicon substrate and firstly to deposit on its upper side a membrane layer made of silicon oxide, silicon nitride, or similar materials. A metal layer is then applied onto the entire surface of the membrane layer, and the measurement and heating elements, conductor paths, etc. are patterned out it by photolithography and etching. In a further process step the recess is etched in, proceeding from the back side of the silicon substrate, by manner of an etching frame, so that only a frame made of silicon, with the membrane spanned within it, remains. The underside of the membrane layer is then open (except where it covers the frame), i.e. it is bounded by air.

This membrane construction produces a thermal insulation, between the resistors patterned out of the metal layer and the substrate, that is ensured by the recess and the air present in it (the thermal conductivity of air or $SiO_2$ is approximately two orders of magnitude less than that of silicon). Without a recess, a substantial portion of the heat generated by the heating element would not be dissipated by the medium flowing past, but rather would flow away through the membrane layer to the silicon substrate. This heat flowing away laterally and vertically into the substrate would be problematic simply because a predefined working temperature that is also important in terms of measurement sensitivity would be achievable, at best, only by increasing the energy consumption of the heater.

A lateral heat outflow would be problematic in terms of the measurement elements that are typically positioned laterally next to the heater, since their function is based on the existence of a temperature gradient. This gradient exists between the center of the membrane (heated by the heating element) and the edge of the sensor (which should be as close as possible to ambient temperature). With a lateral heat outflow, to which the direct thermal coupling via the membrane itself does not make a substantial contribution, the temperature measurement elements would also be heated via the substrate. The decreased temperature gradient between heater and measurement elements would result directly in decreased sensor sensitivity. Thermal decoupling in the lateral and vertical directions thus appears indispensable.

As discussed, however, the membrane sensors require for their manufacture a volume-based micromechanical process from the back side of the substrate. This patterning of the membrane may be accomplished via a KOH etching process in which the wafer is inserted into an etching box. The manufacturing method using bulk silicon micromechanics with an integrated back-side process is very complex and therefore associated with high cost. In addition, the thin membrane, with typical thicknesses of 1 to 2 um, has a tendency toward undesired vibrations due to its low mechanical stability.

SUMMARY OF THE INVENTION

An exemplary embodiment of the present invention provides a micromechanical mass flow sensor that may be manufactured with less complexity than before, and that has sufficient sensitivity and mechanical stability. The present invention is also provides a corresponding manufacturing method for a sensor of this kind.

This may be achieved by manner of a sensor according to the present invention and a method for manufacturing that sensor according to the present invention.

The exemplary method produces a micromechanical mass flow sensor including a layered structure on the upper side of a silicon substrate, the layered structure encompassing an electrically conductive layer out of which at least one heating element is patterned; and including a thermal insulation between the heating element and the silicon substrate, the thermal insulation encompasses a silicon dioxide block, the silicon dioxide block is produced beneath the heating element either in the layered structure on the silicon substrate or in the upper side of the silicon substrate.

The exemplary embodiment and/or exemplary method of the present invention provides for the thermal insulation to be arranged between the (platinum) resistors and the silicon substrate substantially by manner of a sufficiently thick silicon dioxide layer that also has adequate mechanical stability. This silicon dioxide layer is embodied as an oxide block, and either is patterned directly into the silicon substrate from the upper side, or is manufactured on the silicon substrate in a corresponding layered structure. In the latter case, a silicon oxide layer is applied on the silicon substrate, and a silicon layer is applied above that, and the silicon dioxide block is produced in the silicon layer.

The sensor according to the present invention provides that only surface micromechanical processes, i.e. only front-side processes, are necessary for manufacture, so that complex back-side processes can be omitted. Elimination of the KOH etching step from the back side moreover may allow a miniaturization of the component. Also, the sensor provides for reduction in scratches and particles on the front side of the wafer, which are almost unavoidable in conjunction with handling in the context of back-side processes.

One exemplary embodiment of this sensor lies in the fact that a plurality of vertical, crevice-shaped cavities are formed in the oxide block. Since the cavities contain air or a vacuum, the thermal insulation is considerably increased by an oxide block patterned in this fashion.

Configuration of the oxide block in a layered structure, as mentioned previously, opens up the possibility of removing the silicon oxide layer beneath the oxide block and configuring there, toward the silicon substrate, a horizontal cavity that then contributes substantially to the thermal insulation.

At least one pillar, adjoining the silicon dioxide block at the top and the silicon substrate at the bottom, may be positioned in the horizontal cavity and further improves mechanical stability.

The present invention furthermore produces a method for manufacturing a sensor where after patterning of an etching mask, which either is applied on a silicon layer that is applied above a silicon oxide layer on the silicon substrate, or is applied directly on the silicon substrate, approximately vertical grooves are produced by etching in the silicon material located below the etching mask, lands of silicon remaining behind between the grooves. The lands are then completely oxidized by thermal oxidation. The silicon dioxide block produced in this manner by surface micromechanics is covered by deposition of a silicon dioxide sealing layer. Before deposition and patterning of the electrically conductive layer, a leveling step is performed to produce a a smooth surface on the silicon dioxide block.

The method according to the present invention permits easy manufacture of the sensor, using only methods from other systems in semiconductor technology. This may allow for the production of a reproducible layer thickness and structure for the oxide block. In particular, in the interest of greater porosity and thus insulation of the oxide block, the silicon layer or the silicon substrate may be undercut beneath the etching mask by isotropic etching. If the etching mask remains on the lands after etching and is later also covered, wider grooves with thinner lands may be generated. In general, only a few layers and photolithography steps are necessary according to the present invention.

One exemplary embodiment of the method according to the present invention lies in depositing a silicon oxide layer for planarization and then planarizing by chemical-mechanical polishing (CMP). This can be performed by manner of a silicon oxide auxiliary layer or also with the use of the silicon dioxide sealing layer. The step of leveling the topography, which is necessary due to the thin, sensitive, electrically conductive layer that is later applied, thereby becomes efficient.

DETAILED DESCRIPTION

Figure 1:
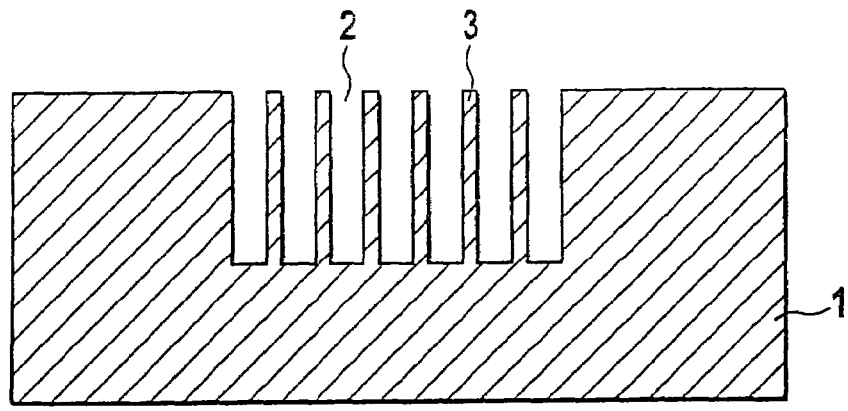
FIG. 1 shows a step in the manufacture of a first exemplary embodiment.

FIG. 1 shows a silicon substrate 1 in which grooves 2 have already been produced by etching from the upper side. Similar grooves, albeit only up to approx. 20 µm deep and produced for other purposes, may be referred to in other surface micromechanics systems. The width of lands 3 separating grooves 2 is selected so that upon subsequent thermal oxidation, lands 3 are in all cases completely oxidized. The state achieved thereafter is shown for the situation in which the initial width of grooves 2 was selected so that after complete oxidation of lands 3, there remains between them a crevice 4 shown in FIG. 2. The initial width of grooves 2 may also be selected so that grooves 2 are completely closed up (see FIG. 3).

In order to produce additional cavities, additional grooves may be etched, from the outset, transversely to grooves 2. In this case lands 3 exhibit interruptions and are made up, strictly speaking, of columnar land elements.

Thermal oxidation is a relatively slow surface process that nevertheless results in conformal growth of the oxide even in the grooves. In all cases, the process must be continued until lands 3, typically 1 to 5 µm wide, are each constituted entirely of $SiO_2$.

Figure 2:
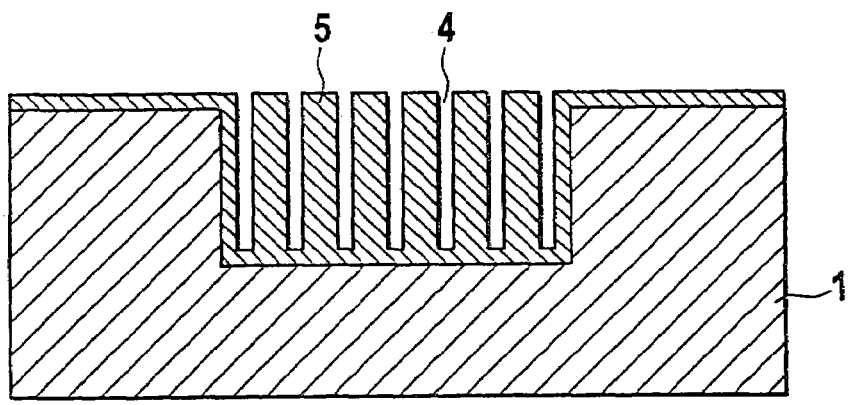
FIG. 2 shows a steps in the manufacture of a first exemplary embodiment.
Figure 3:
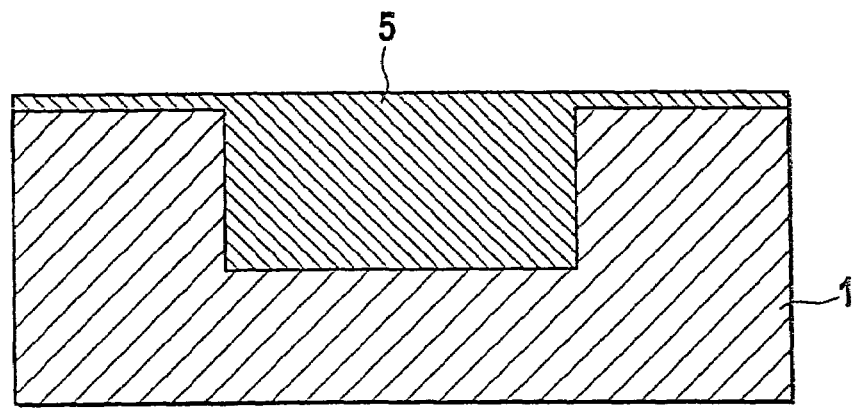
FIG. 3 shows a step in the manufacture of a first exemplary embodiment.

In the state as shown in FIG. 2 or 3, the actual oxide block 5 having the desired low thermal conductivity has already been produced. The discussion hereinafter will always be of the exemplary embodiment including crevices 4 as shown in FIG. 2, since oxide block 5 constructed in this fashion yields insulation advantages. The necessary thickness of oxide block 5 is on the one hand to be selected in accordance with requirements, and on the other hand can be decreased by manner of vertical and/or horizontal cavities. Typically, a thickness of up to 100 µm will be sufficient. As the thickness of oxide block 5 increases, so does the mechanical stability of the sensor.

Figure 4:
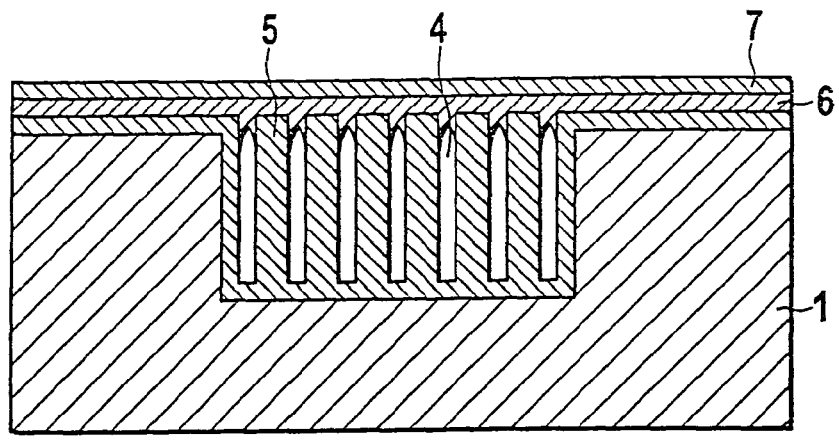
FIG. 4 shows a step in the manufacture of a first exemplary embodiment.
Figure 5:
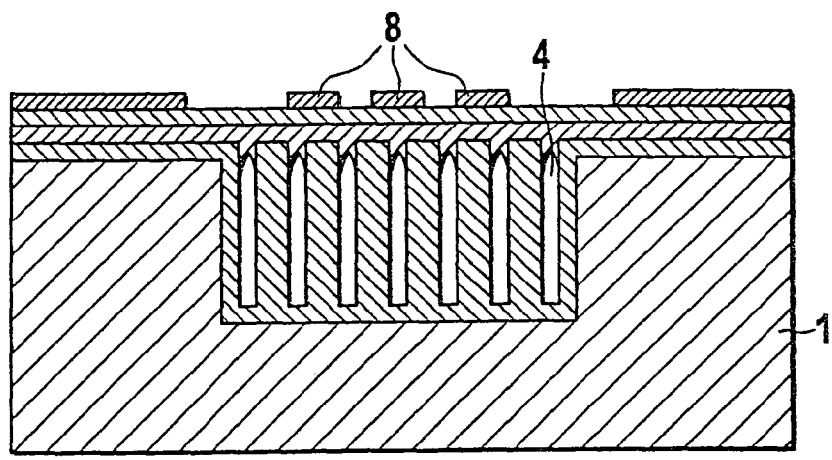
FIG. 5 shows a step in the manufacture of a first exemplary embodiment.
Figure 6:
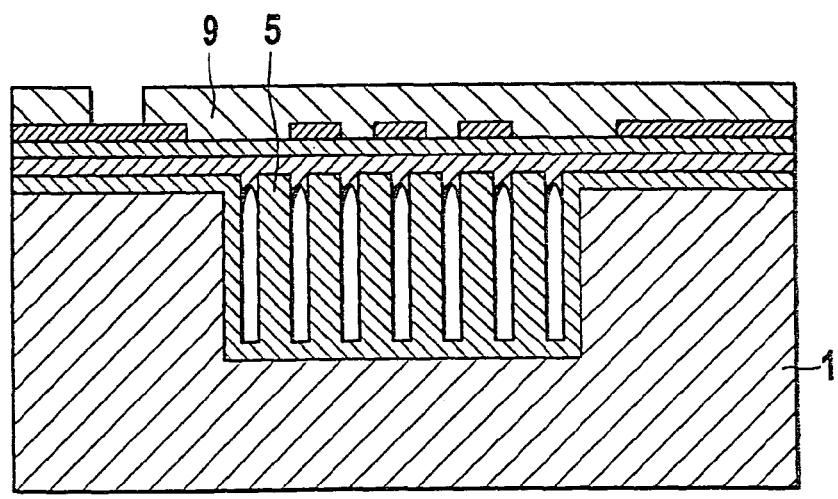
FIG. 6 shows a step in the manufacture of a first exemplary embodiment.
Figure 7:
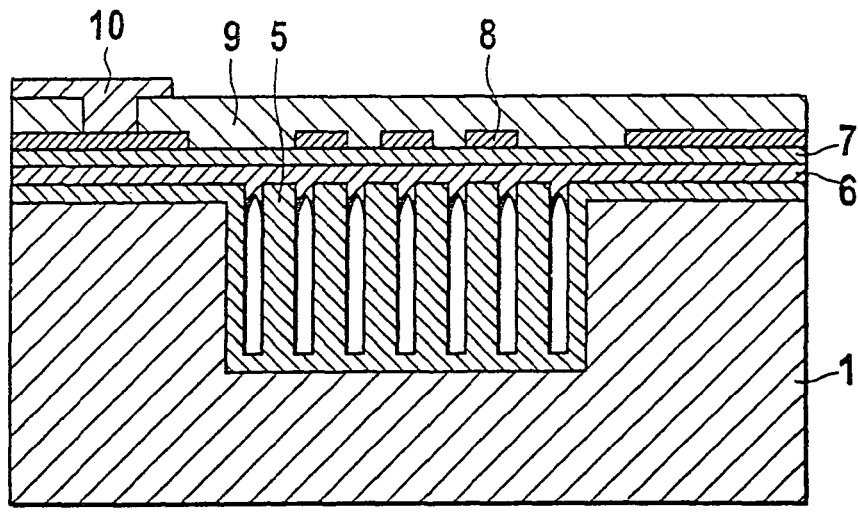
FIG. 7 shows a step in the manufacture of a first exemplary embodiment.

As the next step, an oxide sealing layer 6 is deposited over the entire surface of substrate 1, and over that a nitride layer for moisture rejection, resulting in the state shown in FIG. 4. In the step thereafter, the platinum layer for resistors 8 (heating and measurement elements), pads, etc. is deposited and patterned (cf. FIG. 5). The spacings of resistors 8 are typically only a few um, so that many of them may, if applicable, be positioned next to one another. Instead of platinum, another electrically conductive layer, made in particular of metal, polysilicon, or germanium, can be produced and patterned. Lastly, a protective oxide layer 9 having a thickness of only a few nm can be deposited and patterned (cf. FIG. 6). Deposition and patterning of aluminum conductor paths 10 are performed last, yielding the finished sensor as shown in FIG. 7.

Figure 8:
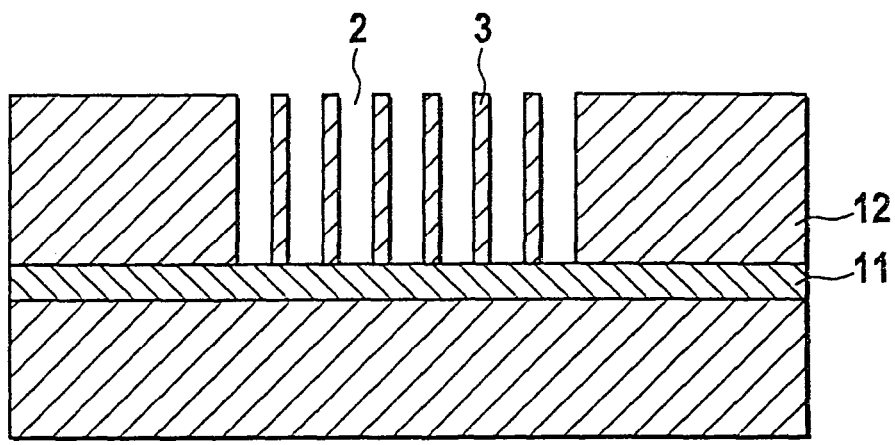
FIG. 8 shows a step in the manufacture of a second exemplary embodiment.
Figure 9:
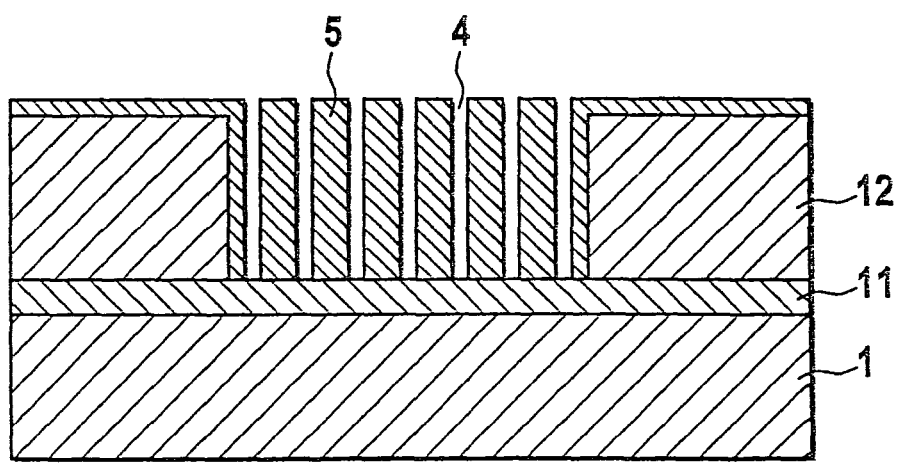
FIG. 9 shows a step in the manufacture of a second exemplary embodiment.
Figure 10:
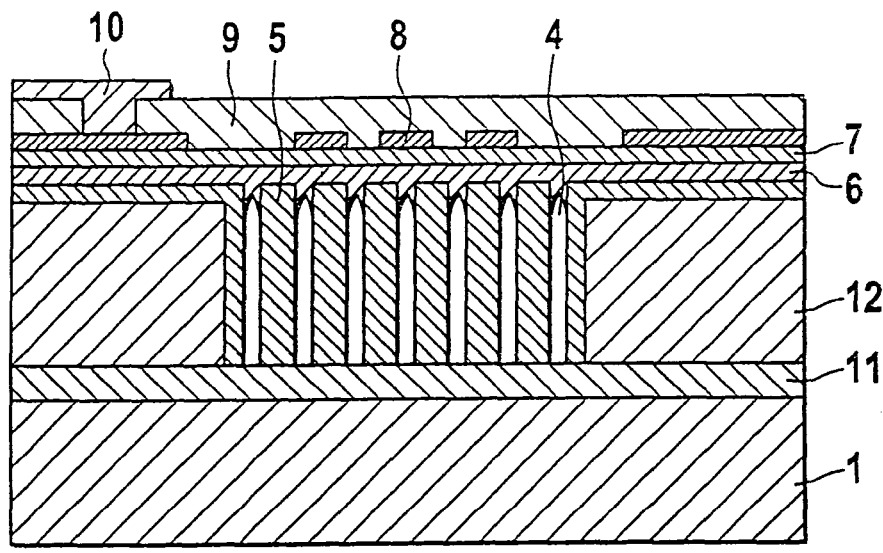
FIG. 10 shows a step in the manufacture of a second exemplary embodiment.

FIGS. 8 and 9 show a exemplary embodiment of the sensor in which oxide block 5 is produced not in substrate 1 itself, but in a suitable layered structure on its upper side. As shown in FIG. 8, the procedure begins with a substrate 1 on which a (buried) oxide layer 11 and a silicon layer 12 (for example, epitaxially grown polysilicon) are applied. Oxide layer 11 serves as an etching stop during production of silicon lands 3 and grooves 2. FIG. 9 shows, by analogy with FIG. 2, oxide block 5 generated by complete oxidation of silicon lands 3 by manner of thermal oxidation. The further method steps may be completed by analogy with the steps already shown in FIGS. 4 through 6, so that ultimately the final result shown in FIG. 10 is obtained.

Figure 11:
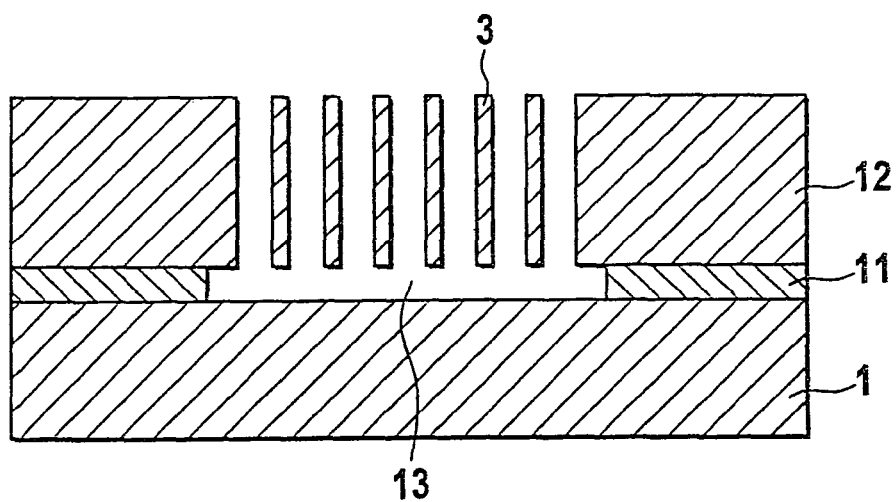
FIG. 11 shows a further exemplary embodiment.
Figure 12:
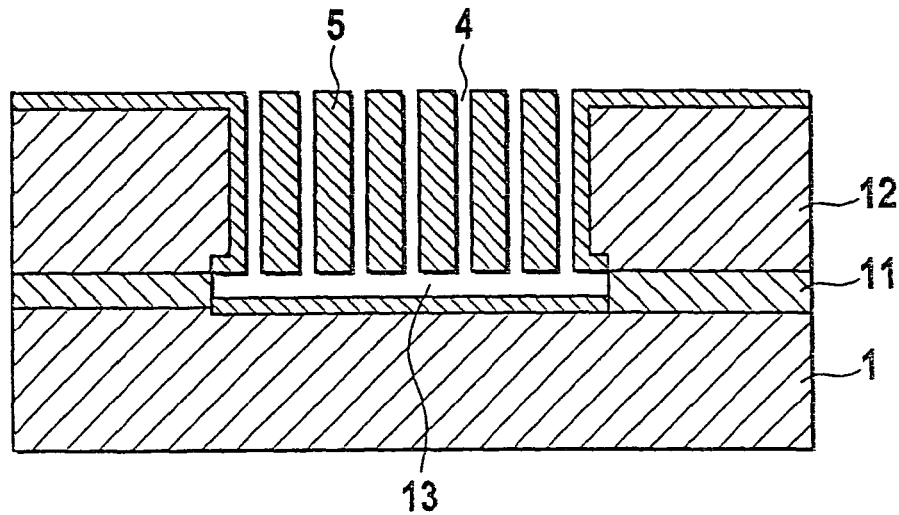
FIG. 12 shows a further exemplary embodiment.

The exemplary embodiment just shown may be used as a starting point for a further exemplary embodiment, in which firstly a gas-phase etching step is performed that results in partial removal of oxide layer 11 beneath the patterned silicon layer. A horizontal cavity 13 is thus generated there (cf. FIG. 11), providing additional thermal insulation between platinum resistors 8 and substrate 1. Oxide block 5 is then once again produced in silicon layer 12 by analogy with FIGS. 8 and 9, resulting in the finished state as shown in FIG. 12. The further steps may occur in the manner already described, resulting in the final state shown in FIG. 13. The necessary thickness of oxide block 5 may be reduced by, or to, a fraction of its value by manner of the additional cavity 13.

Figure 13:
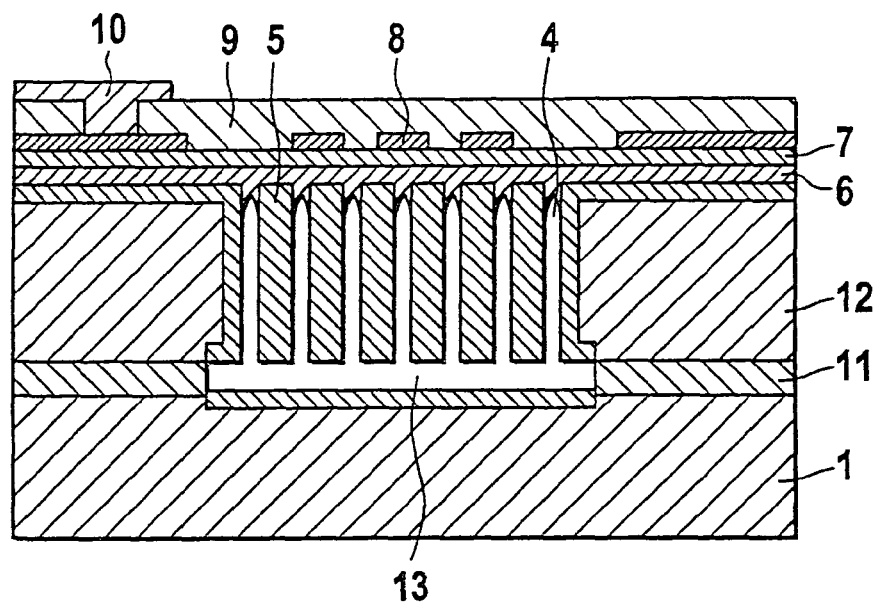
FIG. 13 shows a further exemplary embodiment.
Figure 14:
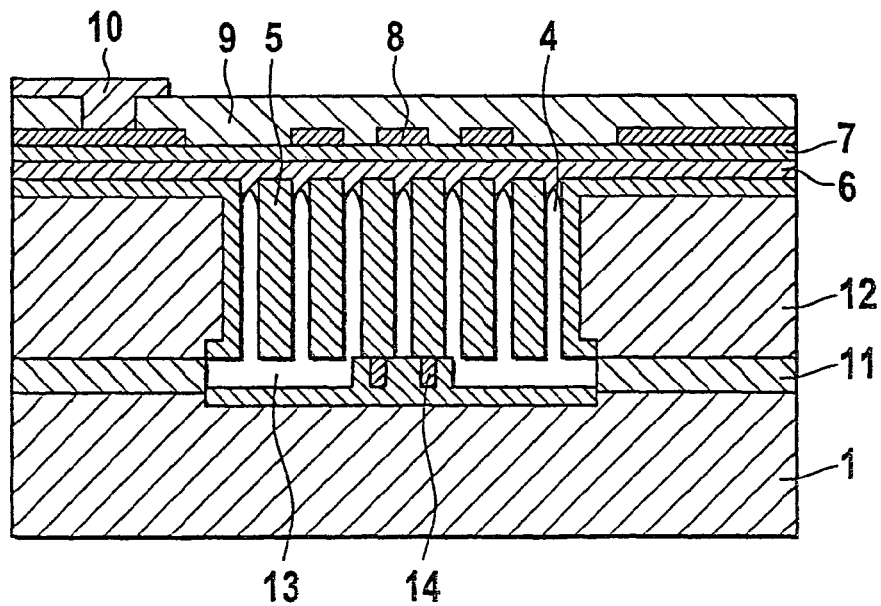
FIG. 14 shows a further exemplary embodiment.

FIG. 14 shows a completed sensor 1 that conforms to the exemplary embodiment shown in FIG. 13, except that at least one pillar 14, adjoining oxide block 5 at the top and substrate 1 at the bottom, is additionally positioned in horizontal cavity 13. In terms of the process sequence, this requires that oxide layer 11 be appropriately patterned before the application of silicon layer 12. Pillar 14 may allow for greater mechanical stability for this sensor configuration, so that oxide block 5 may not be caused to vibrate by the air flow being measured.

Figure 15:
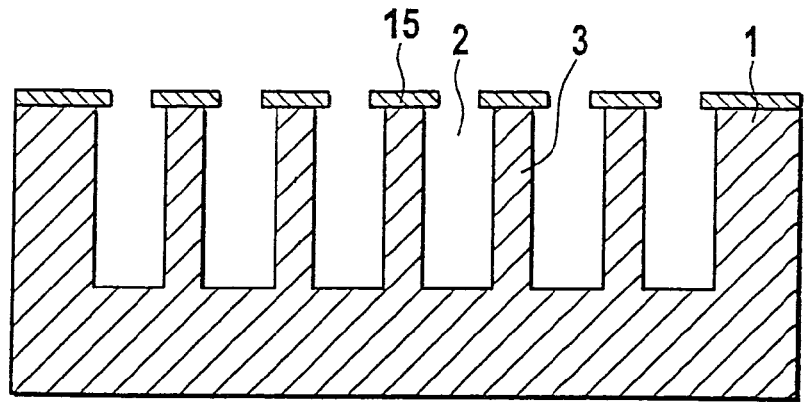
FIG. 15 shows an exemplary embodiment of the manufacturing method that is usable for all the exemplary embodiments.

FIG. 15 shows a favorable procedure for producing wider grooves 2 with thinner lands 3. In this, etching mask 15 (a hard mask, in particular $SiO_2$) that remains behind after the etching of grooves 2 is not removed, but instead remains on substrate 1 during subsequent thermal oxidation. Trenching processes with stronger undercutting caused by isotropic etching, as evident in FIG. 15, may be effective in this context. In this case, etching mask 15 persists after the trenching process, with an opening that is smaller than the groove width. This may fllow for, after oxidation of lands 3, seal up of even wide grooves 2 or crevices 4, for example using an $SiO_2$ sealing layer. The wide grooves 2 or crevices 4 may allow a greater porosity, with the corresponding insulation advantage, to be produced.

Figure 16:
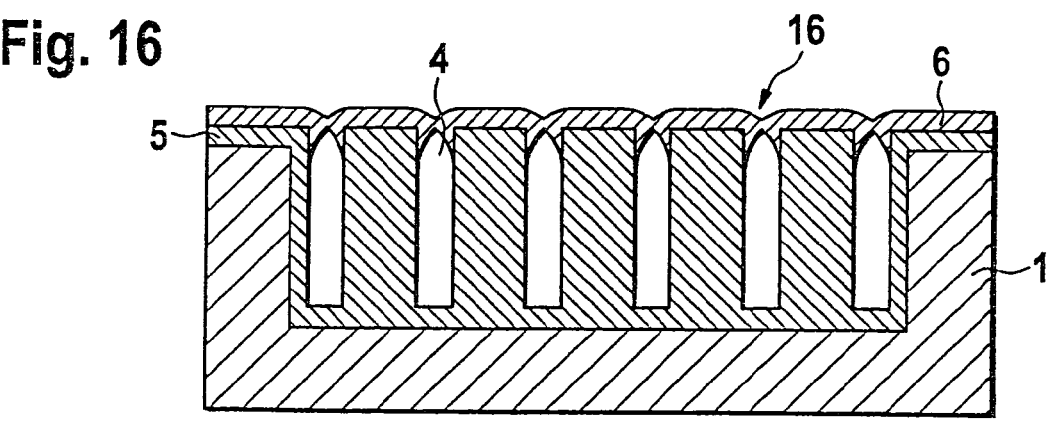
FIG. 16 show a step of two exemplary embodiments of the manufacturing method usable for leveling.

As shown in FIG. 16, covering oxide block 5 e.g. with oxide sealing layer 6 does not immediately yield a flat surface. As has been ascertained in SEM investigations, depressions 16 occur above crevices. This undesirable topography of only a few micrometers is nevertheless highly problematic in terms of the metal layer that must be applied later. The typical thickness of the platinum layer is approximately an order of magnitude thinner than the topography, so that a considerable risk of breakage would exist.

Figure 17:
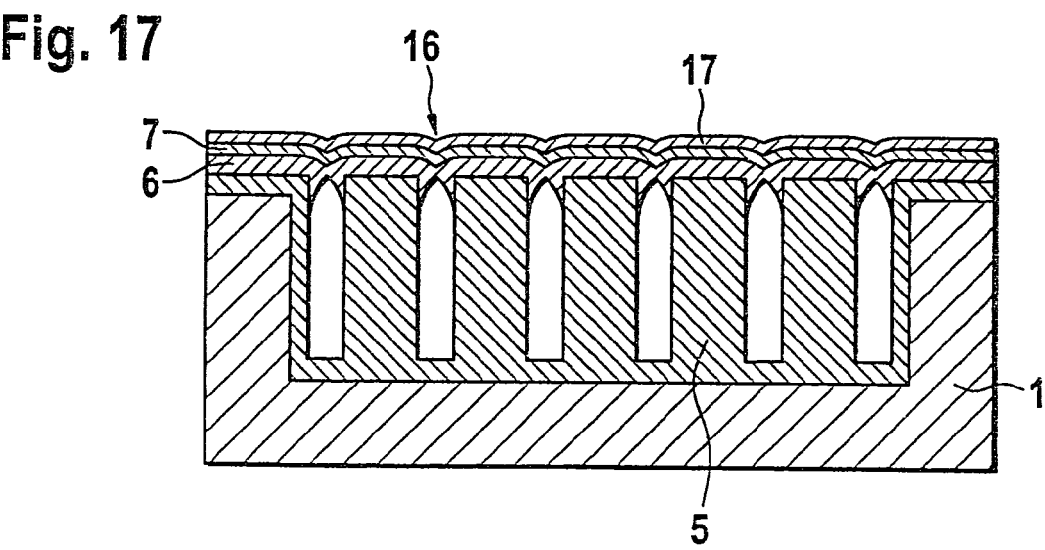
FIG. 17 shows a step of two exemplary embodiments of the manufacturing method usable for leveling.
Figure 18:
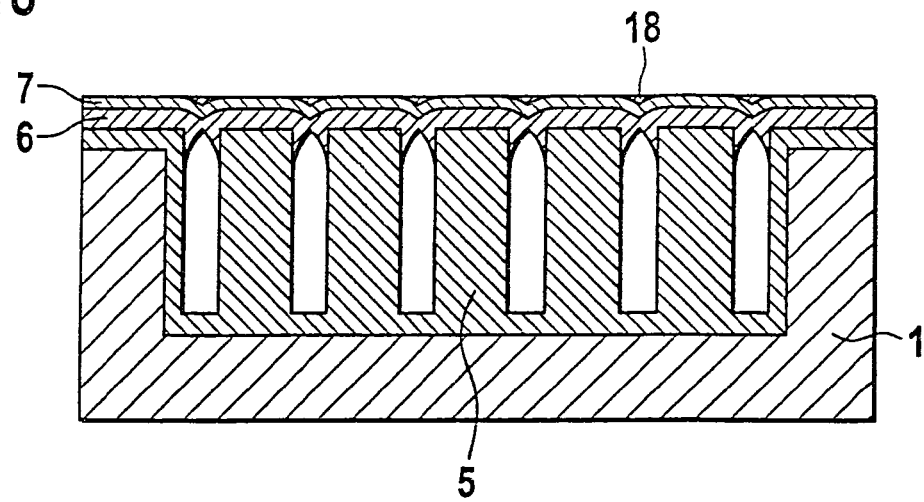
FIG. 18 shows a step of two exemplary embodiments of the manufacturing method usable for leveling.

FIG. 17 shows one possibility for leveling the topography shown in FIG. 16. Firstly a nitride layer 7 is deposited onto oxide sealing layer 6; it is evident that this may allow depressions 16 to persist. An $SiO_2$ auxiliary layer 17 is then applied onto nitride layer 7 for subsequent planarization. Planarization of auxiliary layer 17 is accomplished, by manner of the chemical-mechanical polishing (CMP) method of other systems, down to nitride layer 7 which here serves initially as a planarization stop. A residual oxide 18 remains behind in depressions 16, and planarizes the surface as is evident from FIG. 18. Platinum structures, protective oxide layers, and aluminum conductor paths can then be deposited and patterned as already described above.

Figure 19:
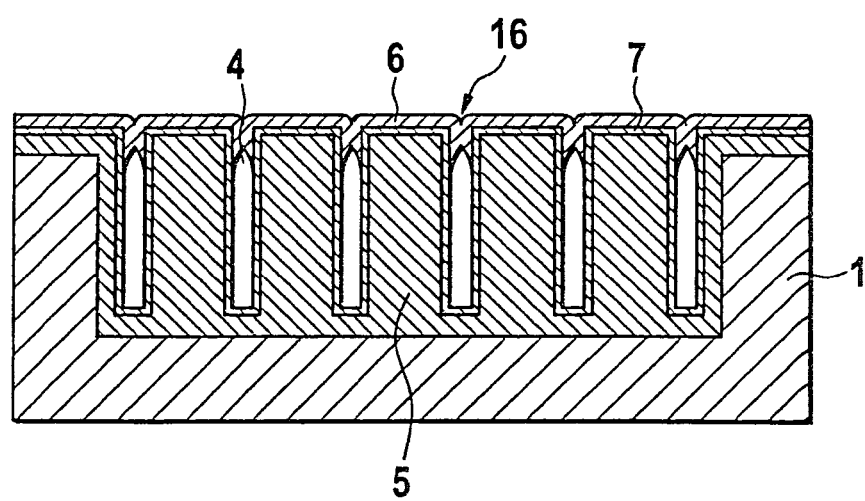
FIG. 19 shows a step of two exemplary embodiments of the manufacturing method usable for leveling.

Another possibility for leveling is shown in FIG. 19. In this exemplary embodiment, nitride layer 7 is deposited before oxide sealing layer 6. This eliminates the need for subsequent deposition of oxide auxiliary layer 17 described above.

Figure 20:
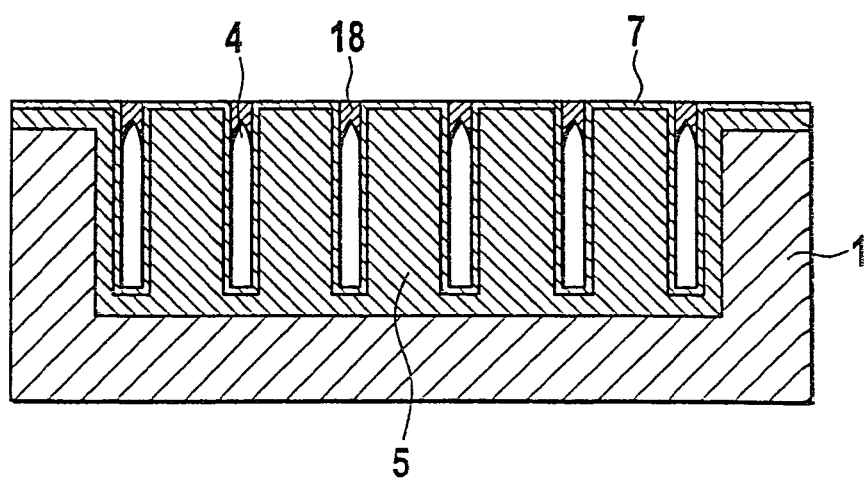
FIG. 20 shows a step of two exemplary embodiments of the manufacturing method usable for leveling.

FIG. 19 shows the deposited nitride layer 7 and oxide sealing layer 6 deposited thereonto, which once again includes depressions 16. Planarization of the structure down to nitride layer 7, which serves as a planarization stop, can once again be accomplished, as described above, by manner of CMP. Residues 18 of oxide sealing layer 6 then remain behind at those points at which the critical depressions 16 were previously located (cf. FIG. 20). To improve adhesion of the platinum structures, nitride layer 7 can be converted back into an oxide layer at the surface, in a manner referred to in other systems, using a reoxidation process. Platinum structures, protective oxide layers, and aluminum conductor paths may then be deposited and patterned as described above.

For leveling, as an alternative to CMP planarization, a passivation layer can be applied onto the surface using the spin-on-glass method. The passivation layer flows and fills depressions 16. A thin oxide layer can then be deposited for adhesion of the platinum structures.

As further leveling alternatives, BPSG or PSG can be applied using a flow-glass method (like the spin-on-glass method) from other systems in the technology of highly integrated circuits. Depressions 16 are filled by the flow process, and a smooth surface forms. A thin oxide layer may then be deposited.

The topography may also be sufficiently decreased by CVD deposition methods of other systems. With suitable deposition parameters, only depressions 16 are filled with $SiO_2$, and an almost planar surface is established.

What is claimed is:

1. A method for manufacturing a micromechanical mass flow sensor, the method comprising:
    patterning an etching mask that is one of applied on a silicon layer that is applied above a silicon oxide layer on a silicon substrate and applied directly on the silicon substrate;
    producing vertical grooves by etching in the silicon layer and the silicon substrate, lands of silicon remaining behind between the vertical grooves;
    oxidizing the lands of silicon by thermal oxidation;
    covering the silicon dioxide block by depositing a silicon dioxide sealing layer, and leveling it to produce a smooth surface on a silicon dioxide block;

wherein the etching mask is applied on the silicon layer, and before oxidation of the lands, the silicon oxide layer is at least partly removed by a gas-phase etching step to produce a horizontal cavity beneath a patterned region of the silicon layer;

wherein to produce at least one pillar in the horizotal cavity, the silicon oxide layer is patterned before applying the silicon layer.

2. The method of claim 1, where one of the silicon layer and the silicon substrate is undercut beneath a hard mask by isotropic etching, and the hard mask remains behind on the lands of silicon after etching and is later covered.

3. The method of claim 1, wherein there is deposited on the silicon dioxide sealing layer a nitride layer onto which a silicon oxide auxiliary layer is deposited for planarization and is then planarized down to the nitride layer.

4. The method of claim 1, wherein a nitride layer and then a silicon dioxide sealing layer are deposited one of onto oxidized structures in the silicon layer and in the silicon substrate, and are then planarized down to the nitride layer.

5. The method of claim 3, wherein the planarization is accomplished by chemically-mechanically polishing one of the silicon oxide auxiliary layer and the silicon dioxide sealing layer, the nitride layer serving as a planarization stop.

6. The method of claim 4, wherein the planarization is accomplished by chemically-mechanically polishing one of the silicon oxide auxiliary layer and the silicon dioxide sealing layer, the nitride layer serving as a planarization stop.

7. The method of claim 1, wherein the leveling is accomplished by one of a spin-on-glass process and a flow-glass process.

* * * * *

UNITED STATES PATENT AND TRADEMARK OFFICE
CERTIFICATE OF CORRECTION

| | | |
|---|---|---|
| PATENT NO. | : 7,060,197 B2 | Page 1 of 1 |
| APPLICATION NO. | : 10/362654 | |
| DATED | : June 13, 2006 | |
| INVENTOR(S) | : Fuertsch et al. | |

It is certified that error appears in the above-identified patent and that said Letters Patent is hereby corrected as shown below:

On the Title Page, Item (57), under the heading "Abstract", line 2, change "a silicon substrate (1)," to --a silicon substrate,--

On the Title Page, Item (57), under the heading "Abstract", line 3, delete "(8)"

On the Title Page, Item (57), under the heading "Abstract", line 4, delete "(8)"

On the Title Page, Item (57), under the heading "Abstract", line 5, delete "(1)"

On the Title Page, Item (57), under the heading "Abstract", line 6, delete"(5)"

On the Title Page, Item (57), under the heading "Abstract", line 7, delete "(8)"

On the Title Page, Item (57), under the heading "Abstract", line 8, delete "(1)"

On the Title Page, Item (57), under the heading "Abstract", line 8, change "the silicon substrate (1)." to --the silicon substrate.--

Column 3, line 58, change "FIG. 2 shows a steps" to --FIG. 2 shows a step--

Signed and Sealed this

Thirteenth Day of November, 2007

JON W. DUDAS
*Director of the United States Patent and Trademark Office*